United States Patent
Dong et al.

(10) Patent No.: US 10,624,255 B2
(45) Date of Patent: Apr. 21, 2020

(54) POT SEEDLING AUTOMATIC FEED MECHANISM FOR SEMI-AUTOMATED TRANSPLANTER

(71) Applicant: Jiangsu University, Zhenjiang County (CN)

(72) Inventors: Lili Dong, Zhenjiang County (CN); Qiang Shi, Zhenjiang County (CN); Weiguo Fu, Zhenjiang County (CN); Xin Lu, Zhenjiang County (CN)

(73) Assignee: Jiangsu University (CN)

( * ) Notice: Subject to any disclaimer, the term of this patent is extended or adjusted under 35 U.S.C. 154(b) by 22 days.

(21) Appl. No.: 15/578,068

(22) PCT Filed: Jun. 8, 2016

(86) PCT No.: PCT/CN2016/085233
§ 371 (c)(1),
(2) Date: Nov. 29, 2017

(87) PCT Pub. No.: WO2016/202208
PCT Pub. Date: Dec. 22, 2016

(65) Prior Publication Data
US 2018/0146613 A1    May 31, 2018

(30) Foreign Application Priority Data
Jun. 16, 2015  (CN) .......................... 2015 1 0331706

(51) Int. Cl.
*B65G 47/16*    (2006.01)
*A01C 11/00*    (2006.01)
(Continued)

(52) U.S. Cl.
CPC ............ *A01C 11/006* (2013.01); *A01C 11/02* (2013.01); *B65G 43/00* (2013.01); *B65G 2201/0202* (2013.01)

(58) Field of Classification Search
CPC .... B65G 47/02; B65G 47/16; B65G 47/8823; B65G 47/8815; A01C 11/02; A01C 11/06
(Continued)

(56) References Cited

U.S. PATENT DOCUMENTS

| 3,752,295 A | * | 8/1973 | Hubbell | ................. | B65G 47/00 |
| | | | | | 198/459.7 |
| 3,782,525 A | * | 1/1974 | Flury | .................... | B21D 51/46 |
| | | | | | 198/530 |

(Continued)

FOREIGN PATENT DOCUMENTS

| CN | 102792813 A | 11/2012 |
| CN | 103650719 A | 3/2014 |

(Continued)

OTHER PUBLICATIONS

International Search Report for International Application No. PCT/CN2016/085233, dated Jul. 28, 2016, four pages with translation.
(Continued)

*Primary Examiner* — Joseph A Dillon, Jr.
(74) *Attorney, Agent, or Firm* — Greenberg Traurig, LLP

(57) ABSTRACT

This present invention provides an automatic pot seedlings feeding mechanism for semi-automatic transplanter, comprising a transmission mechanism, a slider-crank mechanism, a stop lever, a side plate, a resetting mechanism and a bearing with bearing support. The transmission mechanism includes a transmission shaft I, a driving wheel, a transmission shaft II, a transmission shaft III and a conveyor belt. Under the performance of the conveyor belt, the pot seedlings are transported forward to the position of the stop lever. The slider-crank mechanism comprises a crank, a slider bar and a sliding chute, the crank and the driving wheel are connected through a revolute pair A, which is on the driving
(Continued)

wheel, but not at the center of the driving wheel. The slider is securely connected with the resetting mechanism.

6 Claims, 2 Drawing Sheets

(51) Int. Cl.
*A01C 11/02* (2006.01)
*B65G 43/00* (2006.01)

(58) Field of Classification Search
USPC ............ 198/341.08, 419.1, 429, 430, 459.6,
198/459.7, 836.3; 222/531, 643;
221/253, 301
See application file for complete search history.

(56) References Cited

U.S. PATENT DOCUMENTS

| | | | | |
|---|---|---|---|---|
| 3,912,071 A * | 10/1975 | Nielsen | ............... | B65G 17/06 198/370.06 |
| 4,228,901 A * | 10/1980 | Watzka | ............. | B65G 47/8823 198/409 |
| 4,360,098 A * | 11/1982 | Nordstrom | ............ | B65G 47/31 198/418.1 |
| 4,969,313 A * | 11/1990 | Nonini | ................ | B65G 57/183 414/791.4 |
| 5,025,911 A * | 6/1991 | Raasch | ................ | A01J 25/162 198/395 |
| 5,400,897 A * | 3/1995 | Doyle | .................. | B65G 45/18 198/496 |
| 5,507,134 A * | 4/1996 | Takeda | .................. | B65G 43/08 53/247 |
| 5,788,051 A * | 8/1998 | Knoepfel | ............... | B21F 33/04 140/3 CA |
| 6,223,875 B1 * | 5/2001 | Malow | ............... | B65G 47/8815 193/35 A |
| 7,401,451 B2 * | 7/2008 | Bennett | ................. | B65G 47/28 53/436 |
| 7,913,518 B2 * | 3/2011 | Winkelhake | ........... | B65G 47/82 198/370.1 |
| 8,025,141 B1 * | 9/2011 | Bouldin | .................. | B26D 1/11 198/343.1 |
| 8,297,846 B2 * | 10/2012 | Meyer | ................... | B65G 39/09 193/37 |
| 8,381,898 B2 * | 2/2013 | Winkelhake | ........... | C03B 9/453 198/430 |
| 2008/0173521 A1 * | 7/2008 | Hitch | ..................... | B65G 15/42 198/698 |
| 2010/0281823 A1 * | 11/2010 | Stahl | ....................... | B65B 23/14 53/154 |
| 2014/0237981 A1 * | 8/2014 | Roberge | ................. | A01D 87/02 56/341 |
| 2015/0068869 A1 * | 3/2015 | Hammacher | ........... | B65B 23/14 198/459.6 |
| 2016/0046447 A1 * | 2/2016 | Bogle | .................... | B65G 23/44 198/617 |
| 2016/0114982 A1 * | 4/2016 | Lichtberger | ......... | B65G 41/005 198/311 |
| 2016/0183464 A1 * | 6/2016 | Hoppel | .................. | B65G 47/18 56/11.1 |
| 2018/0093838 A1 * | 4/2018 | Henderson | ............. | B65G 67/02 |
| 2018/0252059 A1 * | 9/2018 | Vasshus | ............. | B01D 15/1892 |
| 2019/0002212 A1 * | 1/2019 | Itsukaichi | ........... | B65G 47/8823 |
| 2019/0023499 A1 * | 1/2019 | Di | ...................... | B65G 47/8823 |

FOREIGN PATENT DOCUMENTS

| | | |
|---|---|---|
| CN | 103650720 A | 3/2014 |
| CN | 104885665 A | 9/2015 |
| CN | 205052138 U | 3/2016 |
| JP | 5392624 B2 | 1/2014 |

OTHER PUBLICATIONS

Written Opinion for International Application No. PCT/CN2016/085233, dated Jul. 22, 2016, four pages, without translation.

* cited by examiner

POT SEEDLING AUTOMATIC FEED MECHANISM FOR SEMI-AUTOMATED TRANSPLANTER

CROSS REFERENCE TO RELATED APPLICATION

This application is a national stage application under § 371 claiming priority from International Application No. PCT/CN2016/085233 filed Jun. 8, 2016, entitled "Pot Seedling Automatic Feed Mechanism for Semi-Automated Transplanter" and incorporated herein by reference in its entirety.

FIELD OF THE DISCLOSURE

This invention relates to an efficient pot seedlings feeding system for a transplanter. It is applied to the separation and feeding of the seedlings for vegetables and flowers transplanter. It is a part of technical field of agricultural machinery.

BACKGROUND OF RELATED ART

The main advantages of pot seedlings transplanting are as follows: 1) growth periods of vegetables can be shortened, crop arrangement is facilitated and land utilization is improved; 2) the root system of pot seedlings will grow well after the seedlings are planted in the soil, which can provide convenient conditions for follow-up management. Since there is no suitable supporting machinery, the production of vegetables and flowers have been labor intensive industries for a long time. It relies on manual transplanting with high labor intensity, low work efficiency and low transplanting quality, besides, it is difficult to work on large area of land for farmers. Labor cost accounts for over 50% of the total production cost and farmers have to produce in small-scale land with low production efficiency, which restricts the development of vegetable and flower planting industry in China. Mechanized transplanting can reduce labor intensity, improve work efficiency and survival rate of pot seedlings, and it can also improve economic returns and social benefits compared with the traditional manual-transplanting. It is becoming increasing popular with vegetable and flower producers.

The purpose of the pot seedlings feeding mechanism is to deliver a pot seedling into a planter real-time. But the rotary holding cup structure of the existing semi-automatic transplanter is usually used for the seedlings feeding system, only one pot seedling can be fed at a time, and operations cannot be discontinuous. The labor intensity is relatively high and the operators will become tired easily, as a result, the seedling is missed and the transplant quality goes down. The transplanting speed is difficult to be improved effectively influenced by this artificial operation. A fully-automatic transplanter has an automatic seedlings feeding system, which does not require manual seedling feeding, and has a high transplanting speed. However, the fully-automatic transplanter has a relatively complex mechanism system and a very high cost. It is not suitable for medium-scale and small-scale users and the current state of agricultural development in China. In the invention patent (application No. 201210317407.8) of an automatic seedlings picking and feeding mechanism for pot seedling transplanting, an automatic seedlings picking and feeding mechanism for pot seedling transplanting was disclosed, including a displacement mechanism, a support stand, a slide rod, a connecting-rod mechanism and a seedlings clamping mechanism. The support stand is installed on the displacement mechanism so as to implement position switching of the support stand between the seedling picking action and the seedling feeding action. One end of the slide rod is inserted into a slide sleeve movable inside a slide groove on the support stand, and the other end of the slide rod is connected to the seedling clamping mechanism. The displacement mechanism is used to implement switching of the seedlings clamping mechanism between the seedling picking procedure position and the seedling feeding procedure position. The connecting-rod mechanism is used to control the rotation of the slide rod and the seedling clamping mechanism and implement the closing and the opening of a seedling clamp. This device has a relatively complex mechanical structure and high production cost, the seedling clamping mechanism of the device cannot precisely position a pot seedling into a seedling clamping process as well, which results in the loss of seedlings. In the invention patent (application No. 2011101335051) of a mechanical seedling feeding transplanter, a mechanical seedling feeding mechanism which can replace manual operation is disclosed. Multiple pot seedlings can be placed into a mechanical seedling feeding system each time, with the control of electric-control system, the seedling feeding mechanism can drop seedlings automatically by using delivery cups. Thereby, this mechanism improves the speed and efficiency of transplanting work, meanwhile, the production cost is reduced. However, the seedling feeding mechanism has a complex design and a relatively large quantity of parts.

SUMMARY

In view of the major technical deficiencies and defects in the existing seedlings feeding mechanism for transplanters, this present invention provides a simple, adjustable and efficient pot seedling feeding mechanism and its application method for transplanter. The efficiency of the feeding system is improved by placing multiple pot seedlings each time, the labor intensity and nervousness of workers can be reduced, time saving and labor saving are implemented, and at the same time the efficiency and quality of mechanical seedling feeding are improved.

The technical solution of the present invention is as follows:

An automatic pot seedlings feeding mechanism for the semi-automatic transplanter includes: a transmission mechanism, a slider-crank mechanism, a stop lever 9, side plates 2, a resetting mechanism 10 and bearing supports which contains bearings 12. The transmission mechanism contains a transmission shaft I 5, a driving wheel 3, transmission shaft II 8 and a transmission shaft III 11. The transmission shaft I 5 and the driving wheel 3 are connected by the revolute pair E; the transmission shaft II 8 and the conveyor belt 1 are connected by the revolute pair F; the transmission shaft III 11 and the conveyor belt 1 are connected by the revolute pair G. The slider-crank mechanism comprises a crank 4, a slider bar 6 and a sliding chute 7. The crank 4 and the driving wheel 3 are linked through the revolute pair A. The revolute pair A is on the driving wheel 3, but not at the center of the driving wheel 3. The slider bar 6 and the crank 4 are linked through the revolute pair B; the sliding chute 7 and the slider bar 6 are linked by the prismatic pair C; the stop lever 9 and the resetting mechanism 10 are connected by the revolute pair D; the connection of the resetting mechanism 10 and the slider bar 6 are connected by the hinge joint.

When the slider-crank mechanism moves right to the point of the limit position, the stop lever 9 will rotate around the revolute pair D by the action of the sides plate 2 and the resetting mechanism 10, and the stop lever 9 will move to the leading end position of the notch of the sides plate 2; when the slider-crank mechanism moves left to the point of the limit position, the stop lever 9 will get back to the original state under the action of the sides plate 2 and the resetting mechanism 10; When the stop lever 9 is pivoted to the limit position on the sides plate 2, the motor just rotates one or more pulses and controls the conveyor belt 1 to feed a predetermined distance.

In the working of the automatic feedings mechanism of this invention, the stop lever 9 is responsible for separating seedlings. When a seedling receiving barrel of the planting apparatus moves to a seedling receiving position, the stop lever 9 for the feeding action is simultaneously touched and a pot seedling is unfettered, this pot seedling then falls into the seedlings receiving barrel of the planting apparatus under the action of gravity, it can fall into the traditional rotary holding cup of the transplanter. After one pot seedling is released, the stop lever 9 is reset immediately under the action of the resetting mechanism 10, which is used to stop the continuous feeding of the following pot seedlings, and the next pot seedling will be prepared to be fed at the position to insure the function of automatic feeding mechanism. The mechanism of this invention can be directly used in one row transplanter, It can also be used in juxtaposition combination with 2 or more, so as to realize the multi-line automatic feeding of seedlings and transplanting.

In comparison with the prior art, this invention has the following benefits: This automatic feeding mechanism will ensure continuous automation for delivery and separation of the pot seedlings during the task process of the transplanter. Multiple pot seedlings can be placed at a time, the continuous mechanical automation feeding of more than 60 pot seedlings per minute was achieved, it can meet technical requirements of high-speed automatic transplanter, and so as to avoid excessive fatigue caused by frequent repetitive actions of an operator during direct seedling feeding and nervous tension over seedling missing. In addition, the structure of this automatic feeding mechanism is simple, the operation is convenient, the labor intensity and the cost are reduced, and the transplanting efficiency and the transplanting quality are also improved.

Figure 1:
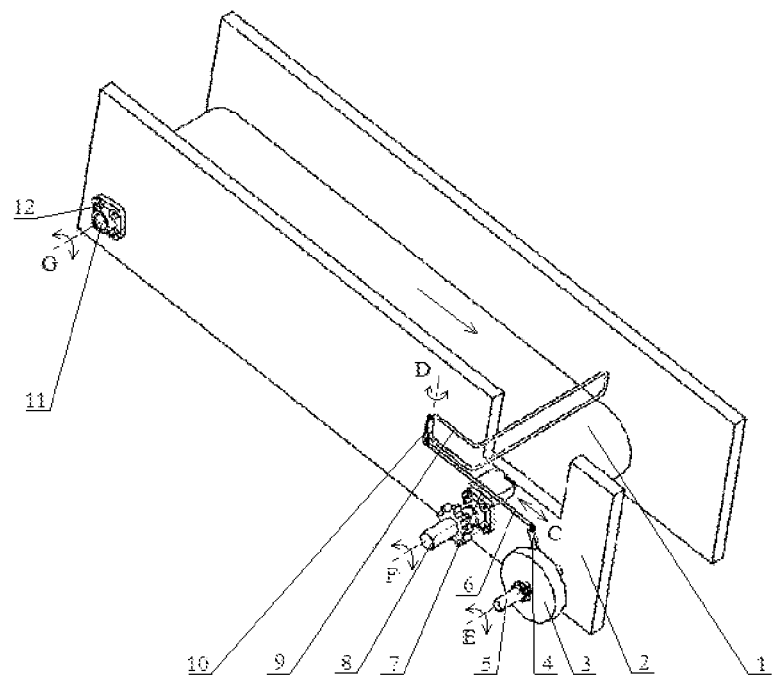
FIG. 1 is a schematic structural view of the automatic pot seedling feeding mechanism.

In the drawings: 1. conveyor belt; 2. side plate; 2-1. opening position on the side plate; 3. driving wheel; 4. crank; 4-1. limit position of crank when the slider-crank mechanism moves to the far right position; 4-2. limit position of crank when the slider-crank mechanism moves to the far left position; 5. transmission shaft I; 6. slider bar; 6-1. limit position of slider bar when the slider-crank mechanism moves to the far right position; 6-2. limit position of slider bar when the slider-crank mechanism moves to the far left position; 7. sliding chute; 8. transmission shaft II; 9. stop lever; 9-1. limit position of stop lever when the slider-crank mechanism moves to the far right position; 9-2. limit position of stop lever when the slider-crank mechanism moves to the far left position; 10. resetting mechanism; 11. transmission shaft III; 12. bearing supports which contains bearings; A-1. limit position of revolute pair A when the slider-crank mechanism moves to the far right position; A-2. limit position of revolute pair A when the slider-crank mechanism moves to the far left position; B-1. limit position of revolute pair B when the slider-crank mechanism moves to the far right position; B-2. limit position of revolute pair B when the slider-crank mechanism moves to the far left position; D-1. limit position of revolute pair D when the slider-crank mechanism moves to the far right position; and D-2. limit position of revolute pair D when the slider-crank mechanism moves to the far left position.

DETAILED DESCRIPTION

The structure, functionality, and processing of the current invention are further described below with reference to the accompanying drawings and the concrete implementation examples. However, the protective range of this present invention includes but not limited to that.

FIG. 1 is a schematic structural view of an automatic pot seedlings feeding mechanism for the semi-automatic transplanter for this invention. It includes a transmission mechanism, a slider-crank mechanism, a top lever 9, a conveyor belt 1, side plates 2, a resetting mechanism 10 and bearing supports which contains bearings 12. The transmission mechanism contains a transmission shaft I 5, a driving wheel 3, a transmission shaft II 8 and a transmission shaft III 11. The transmission shaft I 5 and the driving wheel 3 are connected by the revolute pair E; the transmission shaft II 8 and the conveyor belt 1 are connected by the revolute pair F; the transmission shaft III 11 and the conveyor belt 1 are connected by the revolute pair G. The slider-crank mechanism comprises a crank 4, a slider bar 6 and a sliding chute 7. The crank 4 and the driving wheel 3 are linked through the revolute pair A. The revolute pair A is on the driving wheel 3, but not at the center of the driving wheel 3; the slider bar 6 and the crank 4 are linked through the revolute pair B; the sliding chute 7 and the slider bar 6 are linked by the prismatic pair C; the stop lever 9 and the resetting mechanism 10 are connected by the revolute pair D. The connection of the resetting mechanism 10 and the slider bar 6 are connected by the hinge joint.

Figure 2:
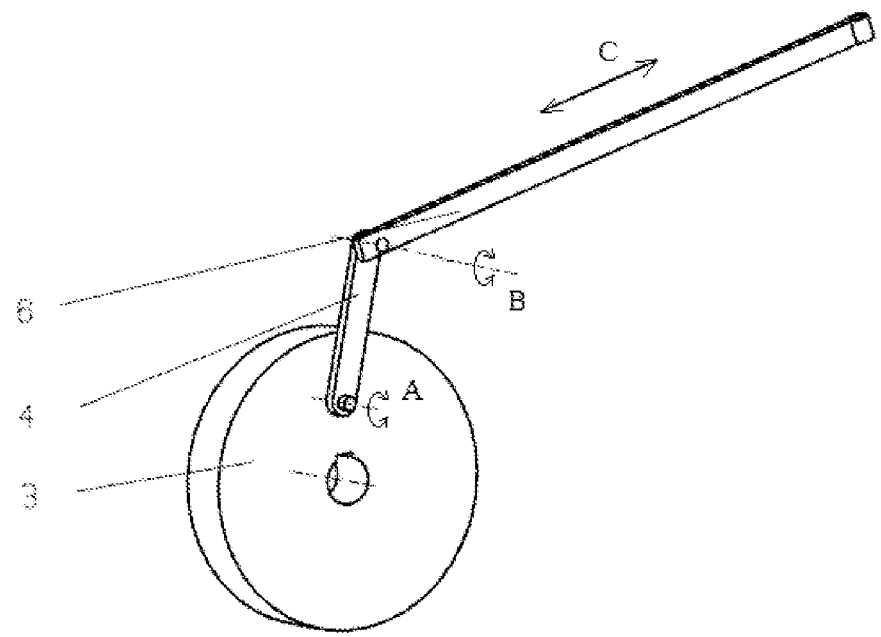
FIG. 2 is a schematic structural view of the slider-crank mechanism of the automatic pot seedling feeding mechanism.
Figure 3:
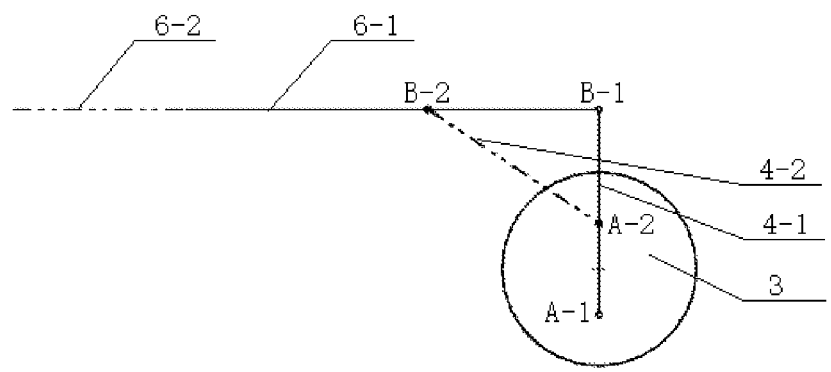
FIG. 3 is a schematic view of the sliding limit position of the slider-crank mechanism of the automatic pot seedling feeding mechanism.

FIG. 2 is a schematic structural view of the slider-crank mechanism of the automatic pot seedlings feeding mechanism. FIG. 3 is a schematic view of the slider limit position of the slider-crank mechanism. If the driving wheel 3 rotates half circle, the slider-crank mechanism slides to the right; when the drive wheel 3 continues to rotate, then the slider-crank mechanism slides to the left, and its limit position is shown in FIG. 3.

Figure 4:
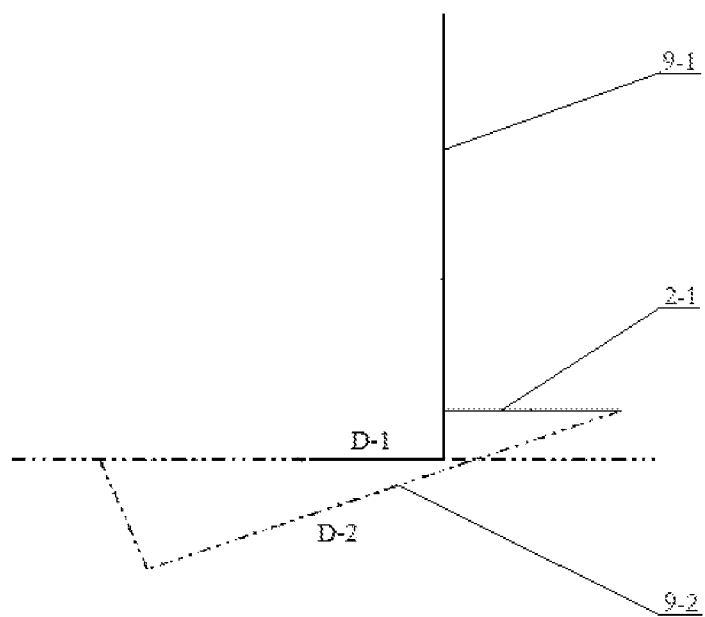
FIG. 4 is a schematic views of the stop lever movement limit position of the automatic pot seedling feeding mechanism.

FIG. 4 is a schematic view of the far right position of the stop lever of the automatic pot seedling feeding mechanism. When the action of the slider bar 6 moves to the right, the stop lever 9 rotates the revolute pair D and reaches the limit position; the stop lever 9 returns to the original position with the action of the resetting mechanism 10. The whole processes are as follows, when a pot seedling slides into a seedling receiving barrel of the planting apparatus, another pot seedling will move ahead a short distance with the help of the conveyor belt 1 and get to the pre-feeding position.

The seedling feeding process for an automatic pot seedlings feeding mechanism of the semi-automatic transplanter is carried out according to the following steps:

a) Firstly, the operator places multiple pot seedlings on the conveyor belt 1 each time. With the driving of the transmission shaft, the pot seedling moves to the pre-feeding position.

b) Secondly, the stop lever 9 is responsible for separating seedlings. When a seedling receiving barrel of the planting apparatus moves to a seedlings receiving position, the stop lever 9 for the feeding action is simultaneously touched and a pot seedling is unfettered, this pot seedling falls into the seedlings receiving barrel of the planting apparatus (or falls into rotary holding cup of the transplanter), then a process of a pot seedling feeding is accomplished successfully.

c) Thirdly, after the stop lever 9 feeds a pot seedling, the stop lever 9 immediately returns to its original position under the action of the resetting mechanism 10, which prevents successive feeding of the next pot seedling, and makes the next seedling wait for the seedlings to be fed in the pre-feeding position, and ensures the implementation of the automatic feeding mechanism. At this point, the seedling feeding system makes one complete cycle of pot seedling feeding, and starts a new cycle.

d) Finally, after the operator places the last group of pot seedlings on the conveyor belt 1, the operator then prepares the next group of pot seedlings, and waits for an opportunity to place them on the conveyor belt 1; this ensures the pot seedlings to be transplanted continuously. Mechanical and continuous seedling feeding of the pot seedling feeding mechanism for the semi-automatic transplanter is implemented according to the foregoing order. Not only the labor intensity and the cost of transplanting operations are reduced, but also the transplanting efficiency and the transplanting quality are improved, and the transplanting speed of more than 60 seedlings per minute is implemented.

The embodiments are preferably implementation manners of this present invention; however, this present invention includes but not limited to the foregoing implementation manners, any obvious improvements, replacements or variations that can be made by a person skilled in the art without departing from the substantial content of the present invention fall within the protection scope of the present invention.

We claim:

1. An automatic pot seedlings feeding mechanism for a semi-automatic transplanter, comprises:
    a transmission mechanism,
    a slider-crank mechanism,
    a stop lever,
    side plates,
    a resetting mechanism-and
    bearing supports which contains bearings;
    wherein the transmission mechanism of the feeding mechanism includes a transmission shaft I, a driving wheel, a transmission shaft II and a transmission shaft III;
    wherein the transmission shaft I and the driving wheel form a fourth revolute pair, the transmission shaft II and the conveyor belt form a fifth revolute pair, the transmission shaft III and the conveyor belt form a sixth revolute pair;
    wherein the slider-crank mechanism comprises a crank, a slider bar and a sliding chute, the crank and the driving wheel are linked through a first revolute pair, the first revolute pair is on the driving wheel, but not at the center of the driving wheel; and
    wherein the slider bar and the crank are linked through a second revolute pair, the sliding chute and the slider bar are linked by the a prismatic pair, the stop lever and the resetting mechanism are connected by a third revolute pair, the connection of the resetting mechanism and the slider bar are connected by a hinge joint.

2. An automatic pot seedlings feeding mechanism for the semi-automatic transplanter according to claim 1, wherein when the slider-crank mechanism moves right to a first point of a limit position, the stop lever will rotate around third revolute pair by the action of the sides plate and the resetting mechanism, and the stop lever will move from an original state to a leading end position of the notch of the sides plate; when the slider-crank mechanism moves left to a second point of a limit position, the stop lever will get back to the original state under the action of the sides plate and the resetting mechanism.

3. An automatic pot seedlings feeding mechanism for the semi-automatic transplanter according to claim 1, wherein the resetting mechanism is composed of a small controllable motor and the cylindrical shell; the motor operably connected to drive the stop lever to wherein the motion of the stop lever is configured to prevent successive feeding of the next pot seedling, the cylindrical shell of the resetting mechanism and one end of the slider bar are connected by the hinge joint.

4. An automatic pot seedlings feeding mechanism for the semi-automatic transplanter according to claim 3, wherein when the stop lever is pivoted to the limit position on the side plate, the motor just rotates one or more pulses and controls the conveyor belt to feed a predetermined distance.

5. An automatic pot seedlings feeding mechanism for the semi-automatic transplanter according to claim 1, wherein the side plates can be bended into a trumpet shape so that the operator will easily send the pot seedlings into the conveyor belt of the transmission mechanism.

6. An automatic pot seedlings feeding mechanism for the semi-automatic transplanter according to claim 1, wherein the automatic pot seedlings feeding mechanism for the semi-automatic transplanter can be used directly for one row transplanter, or the semi-automatic transplanter can also be used in juxtaposition and in combination with two or more semi-automatic transplanters so as to realize the multi-line automatic feeding of seedlings and transplanting.

\* \* \* \* \*